US009490953B2

(12) United States Patent
Yanover et al.

(10) Patent No.: US 9,490,953 B2
(45) Date of Patent: Nov. 8, 2016

(54) METHOD AND SYSTEM FOR DYNAMIC ALLOCATION OF RESOURCES IN A CELLULAR NETWORK

(71) Applicant: Cisco Technology, Inc., San Jose, CA (US)

(72) Inventors: Vladimir Yanover, Kfar-Saba (IL); Ziv Nuss, Tsur Yigal (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/845,995

(22) Filed: Sep. 4, 2015

(65) Prior Publication Data

US 2015/0382367 A1   Dec. 31, 2015

Related U.S. Application Data

(63) Continuation of application No. 14/187,024, filed on Feb. 21, 2014, now Pat. No. 9,313,004.

(30) Foreign Application Priority Data

Feb. 26, 2013  (IL) .......................................... 224926

(51) Int. Cl.
*H04W 28/16*   (2009.01)
*H04L 5/00*     (2006.01)
*H04W 72/08*   (2009.01)
(Continued)

(52) U.S. Cl.
CPC .......... *H04L 5/0053* (2013.01); *H04L 5/0073* (2013.01); *H04L 5/0094* (2013.01); *H04W 28/16* (2013.01); *H04W 72/082* (2013.01); *H04L 5/0035* (2013.01); *H04W 72/04* (2013.01); *H04W 88/02* (2013.01); *H04W 88/08* (2013.01)

(58) Field of Classification Search
None
See application file for complete search history.

(56) References Cited

U.S. PATENT DOCUMENTS 6,141,565 A   10/2000  Feuerstein et al.
6,771,934 B2   8/2004  Demers
(Continued)

FOREIGN PATENT DOCUMENTS

CN   104684052 A   6/2015
EP   1322048       6/2003
(Continued)

OTHER PUBLICATIONS

U.S. Appl. No. 14/092,448.
(Continued)

*Primary Examiner* — Diane Mizrahi
(74) *Attorney, Agent, or Firm* — Patent Capital Group

(57) ABSTRACT

One example method is provided for dynamic allocation of air interface resources in a cellular network. The method can include at least three wireless cells located within a geographical proximity of each other. The method can include determining, by a central managing entity, one or more classification rules for classifying each of said plurality of mobile devices according to the one or more classification rules. The method can also include providing, by the central management entity, to a group of base stations associated with the at least three cells, information that can include, at least in part, information that relates to the determined one or more classification rules and information that relates to semi-static allocation of blocks of air interface resources for use by one or more specific members of the group of base stations.

20 Claims, 6 Drawing Sheets

(51) Int. Cl.
   *H04W 72/04*   (2009.01)
   *H04W 88/02*   (2009.01)
   *H04W 88/08*   (2009.01)

(56) References Cited

U.S. PATENT DOCUMENTS

| | | |
|---|---|---|
| 7,151,937 B2 | 12/2006 | Jin et al. |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,170,544 B1 | 5/2012 | Satapathy et al. |
| 8,194,630 B2 | 6/2012 | Qvarfordt |
| 8,229,451 B2 | 7/2012 | Frenger et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 * | 7/2013 | Dimou .............. H04W 16/02 370/319 |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 2004/0085909 A1 | 5/2004 | Soliman |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2007/0008885 A1 | 1/2007 | Bonner |
| 2007/0253372 A1 | 11/2007 | Nakayasu |
| 2007/0280170 A1 | 12/2007 | Kawasaki |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0192847 A1 * | 8/2008 | Classon .............. H04L 5/0007 375/260 |
| 2008/0268833 A1 | 10/2008 | Huang |
| 2009/0054047 A1 | 2/2009 | Kylvaja |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0112982 A1 | 5/2010 | Singh et al. |
| 2010/0177722 A1 | 7/2010 | Guvenc |
| 2010/0227611 A1 | 9/2010 | Schmidt et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0311449 A1 | 12/2010 | Whinnett |
| 2010/0317351 A1 | 12/2010 | Gerstenberger |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0195730 A1 | 8/2011 | Chami |
| 2011/0201277 A1 | 8/2011 | Eguchi |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046063 A1 | 2/2012 | Chande |
| 2012/0083201 A1 | 4/2012 | Truong |
| 2012/0087247 A1 | 4/2012 | Min et al. |
| 2012/0100849 A1 | 4/2012 | Marisco |
| 2012/0129537 A1 | 5/2012 | Liu et al. |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0163543 A1 | 6/2013 | Freda et al. |
| 2013/0182680 A1 | 7/2013 | Choi et al. |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |

(56) References Cited

U.S. PATENT DOCUMENTS

| | | | |
|---|---|---|---|
| 2014/0113643 A1 | 4/2014 | Ma et al. | |
| 2014/0146732 A1 | 5/2014 | Olufunmilola et al. | |
| 2014/0148179 A1 | 5/2014 | Das et al. | |
| 2014/0153439 A1 | 6/2014 | Nuss et al. | |
| 2014/0155081 A1 | 6/2014 | Nuss | |
| 2014/0155109 A1 | 6/2014 | Vaidya et al. | |
| 2014/0169409 A1 | 6/2014 | Ma et al. | |
| 2014/0185467 A1 | 7/2014 | Heo | |
| 2014/0198678 A1 | 7/2014 | Kim et al. | |
| 2014/0211739 A1 | 7/2014 | Kim et al. | |
| 2014/0213274 A1 | 7/2014 | Weber et al. | |
| 2014/0219117 A1 | 8/2014 | Meshkati et al. | |
| 2014/0220990 A1 | 8/2014 | Lorca Hernando | |
| 2014/0226736 A1 | 8/2014 | Niu et al. | |
| 2014/0241316 A1 | 8/2014 | Okmyanskiy et al. | |
| 2014/0243005 A1* | 8/2014 | Yanover | H04L 5/0053 455/452.1 |
| 2014/0269355 A1 | 9/2014 | Monogioudis et al. | |
| 2014/0273852 A1 | 9/2014 | McCormack et al. | |
| 2014/0274195 A1 | 9/2014 | Singh | |
| 2014/0293906 A1 | 10/2014 | Chang et al. | |
| 2014/0328277 A1 | 11/2014 | Xiao et al. | |
| 2014/0335909 A1 | 11/2014 | Czerepinski | |
| 2015/0011222 A1 | 1/2015 | Brisebois et al. | |
| 2015/0018028 A1 | 1/2015 | Uplenchwar et al. | |
| 2015/0038190 A1 | 2/2015 | Carter et al. | |
| 2015/0055479 A1 | 2/2015 | Reider | |
| 2015/0063223 A1 | 3/2015 | Shen | |
| 2015/0063231 A1 | 3/2015 | Seo et al. | |
| 2015/0087325 A1 | 3/2015 | Nuss et al. | |
| 2015/0138981 A1 | 5/2015 | Nuss et al. | |
| 2015/0141027 A1 | 5/2015 | Tsui et al. | |
| 2015/0146594 A1 | 5/2015 | Grayson et al. | |
| 2015/0148036 A1 | 5/2015 | Grayson et al. | |
| 2015/0208425 A1 | 7/2015 | Caretti et al. | |
| 2015/0256314 A1 | 9/2015 | Gauvreau et al. | |
| 2015/0312778 A1 | 10/2015 | Chandrasekhar et al. | |
| 2015/0318994 A1 | 11/2015 | Walsh et al. | |
| 2015/0351072 A1 | 12/2015 | Okmyanskiy et al. | |
| 2015/0373698 A1 | 12/2015 | Uplenchwar et al. | |

FOREIGN PATENT DOCUMENTS

| | | |
|---|---|---|
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2632072 | 8/2013 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/071308 | 5/2014 |
| WO | WO2014/087392 | 6/2014 |
| WO | WO2014/087393 | 6/2014 |

OTHER PUBLICATIONS

U.S. Appl. No. 14/187,024.
U.S. Appl. No. 14/360,898.
U.S. Appl. No. 14/326,188.
U.S. Appl. No. 14/818,084.
U.S. Appl. No. 14/848,026.
U.S. Appl. No. 14/811,580.
U.S. Appl. No. 14/816,957.
U.S. Appl. No. 14/816,990.
U.S. Appl. No. 14/686,598.
U.S. Appl. No. 14/691,260.
U.S. Appl. No. 14/809,201.
U.S. Appl. No. 14/833,519.
U.S. Appl. No. 14/918,420.
U.S. Appl. No. 14/951,987.
U.S. Appl. No. 14/961,552.
U.S. Appl. No. 15/002,187.
"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F06921, Sophia Antipolis Cedex—France, Jun. 2010; See Section 4, pp. 15-46.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.
"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommu-

(56) References Cited

OTHER PUBLICATIONS nications Standards Institute 2012, 650 Route des Lucioles, F-06921 Sophia Antipolis Cedex—France, Jan. 2015; 368 pages.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.
"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 125 469 v11.2.0, Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS

(56) References Cited

OTHER PUBLICATIONS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communica-

(56) References Cited

OTHER PUBLICATIONS tions (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia—Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Releasel2)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F06921 Sophia—Antipolis Cedex; France; Sep. 2012, 205 pages.
"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia—Antipolis Cedex; France; Sep. 2012, 21 pages.
"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia—Antipolis Cedex; France; Dec. 2009; 208 pages.
"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia—Antipolis Cedex; France; Oct. 2007, XP050423659.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia—Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia—Antipolis; Aug. 2007; XP050162260.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.
Calhoun, P., "Diameter Base Protocol," Network Working Group RFC 3488, Sep. 2003; 147 pages.

(56) References Cited

OTHER PUBLICATIONS

"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"Cisco's One Platform Kit (onePK)," Networking Software (IOS & NX-OS), Cisco Systems, Inc., First published on or about Mar. 3, 2014; 2 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.

Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.

Droms, R., "Dynamic Host Configuration Protocol," Network Working Group RFC 2131, Mar. 1997; 45 pages.

"E Band," from Wikipedia, the free encyclopedia, Dec. 24, 2013; 3 pages.

"EEM Configuration for Cisco Integrated Services Router Platforms," Configuration Guide for Cisco IOS® Embedded Event Manager (EEM), Cisco Systems, Inc., Feb. 2008; 17 pages.

"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.

Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.

Ericsson, et al., "LPN Range Expansion in Co-Channel Deployment in Heterogeneous Networks," 3GPP Draft R1-125219 3rd Generation Partnership Project (3GPP), Mobile Competence Centre; 650; Route Des Lucioles; F-06921 Sophia—Antipolis; Nov. 2012, 7pages.

Ericsson, et al., "On the Feasibility of Operational Carrier Selection," 3GPP Draft R3-112991 , 3rd Generation Partnership Project (3GPP), Mobile Competence Centre; 650; Route Des Lucioles; F-06921 Sophia—Antipolis; Nov. 2011, 7 pages.

"Fading," from Wikipedia, the free encyclopedia, Apr. 10, 2015; 6 pages.

"Frame Structure—Downlink," Share Technote, first published on or about Jul. 9, 2012; 13 pages http://www.sharetechnote.com/html/FrameStructure_DL_html.

"Fuzzy Logic," from Wikipedia, the free encyclopedia, Dec. 3, 2015; 12 pages.

Freescale Semiconductor, "Long Term Evolution Protocol Overview," White Paper, Document No. LTEPTCLOVWWP, Oct. 2008; 21 pages.

Goldsmith, A.J., et al., "Variable Rate Variable-Power MQAM for Fading Channels," IEEE Trans. on Comm. vol. 45, No. 10, Oct. 1997.

"GSMA LTE Roaming Guidelines, Version 9.0," GSM Association, Official Document IR88, Jan. 24, 2013; 53 pages.

Guttman, E., et al., "Service Location Protocol, Version 2," Network Working Group RFC 2608, Jun. 1999, 57 pages.

Haverinen, H., "Extensible Authentication Protocol Method for Global System for Mobile Communications (GSM) Subscriber Identity Modules (EAP-SIM)," Network Working Group RFC 4186, Jan. 2006, 93 pages.

Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of OULU, Department of Computer Science and Engineering; Oct. 2013, 66 pages.

Holbrook, H., et al., "Source-Specific-Multicast for IP," Network Working Group RFC 4607, Aug. 2006.

Horn, Gavin, "3GPP Femtocells: Architecture and Protocols," Qualcomm Incorporated, 5775 Morehouse Drive, San Diego, CA, Sep. 2010; 64 pages.

"Hysteresis," from Wikipedia, the free encyclopedia; Oct. 1, 2015.

"Hybrid Automatic Repeat Request," from Wikipedia, the free encyclopedia, Jun. 8, 2015; 4 pages.

Ku, Gwanmo, "Resource Allocation in LTE," Adaptive Signal Processing and Information Theory Research Group, Nov. 11, 2011; 33 pages.

Kwan, R., et al., "A Survey of Scheduling and Interference Mitiation in LTE," vol. 2010, Article ID 273486, May 30, 2010.

Kwan, R., et al., "On Radio Admission Control for LTE Systems," Proc. of IEEE VTC-fail, Sep. 6-9, 2010.

Leung, K., et al., "WiMAX Forum/3GPP2 Proxy Mobile IPv4," Independent Submission RFC 5563, Feb. 2010; 41 pages.

Lopez-Perez, D., et al., "Interference Avoidance and Dynamic Frequency Planning for WiMAX Femtocells Networks," Proceedings of ICCS, Jun. 23-25, 2008.

LteWorld, "Packet Data Convergence Protocol (PDCP)," Information Page, LteWorld.org, published on or about Jan. 2, 2013; 2 pages.

"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.

"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.

"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.

"LTE Layers Data Flow," LTE Tutorial, tutorialspoint; first published on or about Jan. 17, 2013; 3 pages http://www.tutorialspoint.com/lte/lte_layers_data_flow.htm.

"LTE Protocol Stack Layers," LTE Tutorial, tutorialspoint; first published on or about Jan. 16, 2013 http://www.tutorialspoint.com/lte/lte_protocol_stack_layers.htm.

"LTE Quick Reference," from Share Technote; first published on or about Nov. 28, 2012; http://www.sharetechnote.com/html/Handbook_LTE_RNTI.html.

"LTE Quick Reference: CCE Index Calculation," LTE Handbook, Share Technote, first published on or about Jul. 8, 2012 http://www.sharetechnote.com/html/Handbook_LTE_CCE_Index.html.

"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.

"LTE TDD Overview," from ShareTechnote; first published on or about Jul. 2, 2014 http://www.sharetechnote.com/html/LTE_TDD_Overview.html.

Mehlfuhrer, M., et al., "Simulating the Long Term Evolution Physical Layer," Proc. of 17th European Signal Processing Conference (EUSIPCO), Aug. 24-28, 2009.

Narten T., et al., "Neighbor Discovery for IP version 6 (IPv6)," Network Working Group RFC 4861, Sep. 2007; 97 pages.

NGMN Alliance, "Further Study on Critical C-RAN Technologies," Next Generation Mobile Networks, Mar. 31, 2015; 93 pages.

Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.

Nokia Corporation, et al., "SON WI Status Overview," 3GPP Draft R2-093231, 3rd Generation Partnership Project (3GPP), Mobile Competence Centre; 650; Route Des Lucioles; F-06921 Sophia—Antipolis; Apr. 2009.

Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.

(56) References Cited

OTHER PUBLICATIONS

Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"Radius," Wikipedia, the free encyclopedia, 12 pages [Retrieved and printed Oct. 11, 2013] http://en.wikipedia.org/wiki/RADIUS.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Seo, H., et al., "A proportional-fair power allocation scheme for fair and efficient multiuser OFDM systems," in Proc. of IEEE GLOBECOM, Dec. 2004, Dallas (USA).
Stefan Schwarz etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
EPO Jul. 29, 2014 Extended Search Report from European Application Serial No. EP13195673, 12 pages.
EPO Aug. 12, 2014 Extended EPO Search Report and Opinion from European Application Serial No. 13195780.8.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Mar. 17, 2014 International Search Report and Written Opinion from International Application Serial No. PCT/IL2013/000086, 12 pages.
PCT Jun. 16, 2014 International Search Report and Written Opinion of the International Searching Authority for International Application Serial No. PCT/IL2013/000085.
PCT-Feb. 13, 2013 International Search Report and Written Opinion from International Application PCT/GB2012/052511; 28 pages.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Feb. 8, 2016, entitled "Mitigation of Uplink Interference Within Heterogeneous Wireless Communications Networks," Inventor: Pankaj Uplenchwar, et al.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.

(56) References Cited

OTHER PUBLICATIONS

"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"Received signal strength indication," Wikipedia, the free encyclopedia, Dec. 22, 2014; 2 pages.
Chauhan, Himanshu, "UE Measurements and Reporting in UMTS," Wireless Technologies, Blog dated Apr. 26, 2013; 3 pages; http://worldtechieumts.blogspot.com/2013/04/ue-measurements-and-reporting-in-umts.html.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks, Jul. 19, 2010, 5 pages.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Madan, Ritesh, et al., "Fast Algorithms for Resource Allocation in Wireless Cellular Networks," IEEE/ACM Transactions on Networking, vol. 18, No. 3, Jun. 2010; 12 pages.
Park, Jeongho, et al., "Interference Level Control in Mobile WiMAX Uplink System," 2009 IEEE Mobile WiMAX Symposium, Jul. 9-10, 2009; 5 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Netework Communications & Telematics (IJMNCT) vol. 2, No. 4, Aug. 2012; 8 pages.

Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document No. 3GPPEVOLUTIONWP; Jul. 2007; 27 pages.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Power Control in a Network Environment," Inventors: Ritesh K. Madan, et al.
U.S. Appl. No. 14/479,343, filed Sep. 7, 2014, entitled "Operation of Base Station in a Cellular Communications Network," Inventor: Simon Burley.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/803,475, filed Jul. 20, 2015, entitled "System and Method for Decoupling Long Term Evolution Media Access Control Scheduling From Subframe Rate Procedures," Inventors: Oliver James Bull et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 14/418,084.

* cited by examiner

PRIOR ART: UL interference mitigation using FFR technique

METHOD AND SYSTEM FOR DYNAMIC ALLOCATION OF RESOURCES IN A CELLULAR NETWORK

CROSS-REFERENCE TO RELATED APPLICATIONS

This Application is a continuation (and claims the benefit of priority under 35 U.S.C. §120) of U.S. application Ser. No. 14/187,024, filed Feb. 21, 2014 entitled "METHOD AND SYSTEM FOR DYNAMIC ALLOCATION OF RESOURCES IN A CELLULAR NETWORK," Inventors Vladimir Yanover, et al., which application is based on and claims the benefit of priority under 35 U.S.C. §119 from Israeli Patent Application No. 224926 filed in the Israel Patent Office on Feb. 26, 2013, entitled "METHOD AND SYSTEM FOR DYNAMIC ALLOCATION OF RESOURCES IN A CELLULAR NETWORK." The disclosures of the prior applications are considered part of (and are incorporated in their entirety by reference in) the disclosure of this application.

TECHNICAL FIELD

The disclosure relates to a system and a method for allocating resources in wireless networks, and in particularly to allocating resources and mitigating interference in cellular mobile communication systems.

BACKGROUND

The 3GPP Long Term Evolution ("LTE") Specifications define two types of interference mitigation techniques: The first one being interference mitigation by interference reduction, and the second one is interference mitigation by inter cell interference coordination (ICIC). The 3GPP standard handles the two types of interference minimization differently. The first type, interference reduction, is used in conjunction with coverage and capacity optimization. The enablement of interference reduction are RF techniques such as antenna tilt, transmit power reduction, and handover mechanisms.

The LTE Recommendation has defined an interface between base stations (referred to herein as "eNBs") which enables the transfer of ICIC related indicators. This interface is referred to as X2. These ICIC function indicators are: Relative Narrowband Transmit Power Indicator ("RNTPI"), High Interference Indicator ("HII"), and Interference Overload Indicator ("OI").

The RNTPI indicator message is sent to neighbor eNBs. It contains 1 bit per each physical resource block (PRB) in the downlink transmission, indicating if the transmission power associated with that PRB will be greater than a pre-defined threshold. Thus, neighbor eNBs may anticipate which bands would suffer more severe interference and take the appropriate scheduling decisions immediately, rather than waiting to and relying on the UEs' Channel Quality Information ("CQI") reports.

The HII indicator for uplink transmissions has a somewhat similar function as that which was described above in connection with the RNTPI message for downlink transmissions. There is one bit per each PRB, enabling the neighboring eNBs to assess whether they should expect high interference power in the near future. Reference Signal Received Power ("RSRP") measurements which are reported as part of handover measurement reports, can identify cell edge UEs. In a similar way, this indicator can be used to identify the bands used in a frequency-partitioning scheme.

While the previously described X2 messages are sent out proactively by eNBs, the OI indicator is only triggered when high-interference in the uplink direction is detected by an eNB. An overload indication will be sent to neighbor eNBs whose UEs are potentially the source of this high interference. The message contains a low, medium, or high interference level indication per each PRB. However, the question, which cell is the one responsible for the high interference is of course not a trivial question to answer.

According to the 3GPP Specifications, X2 based ICIC does not include any provisioning for a decision making process, consequently, ICIC algorithms in base stations, which are originated by different vendors, may use completely different logics and criteria. This essentially limits the X2-based ICIC solution to areas where the base stations originate from a single vendor. While in existing macro deployments this constrain might still be achieved, for modern multi-RAT networks (LTE overlay over UMTS network) and HetNet networks, such a requirement of having one vendor's equipment is too restrictive, if not impossible.

According to 3GPP TS 36.300, Inter-cell interference coordination is associated with managing radio resources (notably the radio resource blocks) such that inter-cell interference is kept under control. ICIC is inherently a multi-cell, radio resource management ("RRM") function that needs to take into account information (e.g. the resource usage status and traffic load situation) obtained from various cells. Furthermore, an ICIC method may be different in the uplink and downlink.

The 3GPP Release 10 introduced a new LTE network concept for the heterogeneous networks (HetNets), in contrast to previous network releases, which deal with homogeneous networks. HetNet is defined in that release as a network of eNBs with different capabilities, most importantly, different Tx-power classes.

However, heterogeneous networks pose new ICIC challenges. A first ICIC challenge involves macro UE that roams about a Home eNB (HeNB) and is not part of the closed subscriber group ("CSG"). In that scenario the Macro eNB UE transmission will become uplink interference to the Home eNB authorized UEs. The second ICIC challenge is macro eNB transmission that forms downlink interference to Pico eNB center cell UE. In order to enable the use of HetNet, enhanced ICIC (eICIC) Rel. 10 requires that all members of a HetNet (Macro, Pico, HeNB) should be capable of interconnecting by using the X2 interface.

Soft Fractional Frequency Reuse ("FRR") technique implements separation of transmissions in neighbor LTE cells. The separation is performed by allocating time-frequency resources in blocks (partitions) that appear as rectangles in time-frequency plane as illustrated for example in FIG. 1. This concept may be demonstrated in the following example. For uplink ("UL") transmissions, a time-frequency block X can be allocated to a group of cell edge UEs in cell A, whereas time-frequency block Y is allocated to a group of cell edge UEs in cell B. If X and Y do not overlap, this scheme may alleviate mutual interference between cells A and B.

There are many FFR schemes used for HetNets that allow significant reuse of spectrum. For example in FIGS. 2A and 2B, where A . . . D denote certain "chunks" of the UL frequency channel that are allocated for use by Macro eNBs and for use by Metro eNBs, with differentiation between cell center and cell edge UEs. Such schemes reduce interference because adjacent cells (particularly a Metro cell that can be located within a Macro cell) are using separate orthogonal parts of the spectrum.

However, a solution is still required that enables automatic bandwidth partitioning for example between macro and metro eNBs, and particularly in cases where base stations produced by different vendors and located at the same geographical vicinity, are involved.

SUMMARY OF THE DISCLOSURE

The disclosure may be summarized by referring to the appended claims.

It is an object of the present disclosure to provide a method and system to enable dynamic allocation of air interface resources of the cellular network.

It is another object of the present disclosure to provide a method and system to enable dynamic allocation of air interface resources of the cellular network partially by a central management entity and partially by local entities.

Other objects of the present disclosure will become apparent from the following description.

According to a first embodiment there is provided a method for dynamic allocation of air interface resources in a cellular network comprising at least three wireless cells, all located within a geographical proximity of each other and a plurality of mobile devices currently located within these at least three wireless cells, wherein the method comprises the steps of:
  a) determining, by a central managing entity, one or more classification rules for classifying each of the plurality of mobile devices according to s, wherein the one or more classification rules are based on the one or more members of the group that consists of: the base station which provides service to the respective mobile device; location of the respective mobile device within the wireless cell (e.g. at the cell edge, at the cell core/center), wherein the latter classification rule may be defined for example in terms of range of the signal strength, path loss, SINR, and the like;
  b) providing, by the central management entity, to a group of base stations associated with the at least three cells, information that comprises:
     b.1) information that relates to the determined one or more classification rules;
     b.2) information that relates to semi-static allocation of blocks of air interface resources adapted for use by one or more specific members of the group of base stations, wherein these blocks of air interface resources enable communications between base stations and mobile devices communicating therewith that match one or more classification rules, and wherein no coordination is carried out between any member of the group of base station and any other member of that group regarding the use of the blocks of air interface resources, hence these blocks of air interface resources may be considered as being resources for uncoordinated use; and
     b.3) information that relates to allocation of blocks of air interface resources adapted for use by at least two members of the group of base stations, wherein these blocks of air interface resources enable communications between base stations and mobile devices communicating therewith that match one or more classification rules, and wherein coordination is carried out between at least two members of the group of base stations regarding the use of the blocks of air interface resources, hence these blocks of air interface resources may be considered as being resources for coordinated use;
  c) exchanging messages directly between at least two members of the group of base stations in order to coordinate there-between which part (e.g. different parts) of air interface resource blocks allocated by the central management entity for coordinated use, will be used by each of these at least two members.

The term "semi-static" as used herein throughout the specification and claims should be understood as characterization of one out of two processes being carried out in parallel, wherein the frequency at which the other of the two processes is carried out is substantially higher than the frequency at which the semi static process is carried out. In the present case, the frequency at which the process defined in step b is carried out is substantially lower than the frequency at which step c is carried out, hence step b is semi static with respect to step b.

The term "base station" (BS) as used herein throughout the specification and claims should be understood as a communication entity that contains equipment for transmitting and receiving radio signals (transceivers), antennas. This term should be understood to encompass eNB for example if the cellular network is compatible with the LTE Specifications.

By yet another embodiment, an air interface resource block is characterized by at least one member of the group that consists of: interval time for transmission, transmission frequency, a set of subcarriers, and the like.

By still another embodiment, information related to coordinated use of particular air interface resource block, includes settings of transmission power, for example power density values or limits, for control and user planes at the base station or at the mobile device for which the air interface resource block is allocated.

In accordance with another embodiment, the method further comprises a step of:
  d) repeating step c) to reestablish which part of the air interface resource blocks allocated by the central management entity for coordinated use, will be used by each of the base stations.

Preferably, step c) is repeated every pre-defined period of time which extends up to few hundreds of msec, e.g. from about few tens of msec up to about 150 to 200 msec.

In accordance with another embodiment, steps a) and b) are repeated at a frequency which is substantially less than a frequency at which step c) is repeated.

By still another embodiment, the information that relates to allocation of blocks of air interface resources according to step b) is communicated to respective base stations in a form of time based periodic pattern having a length of N radio frames. In such a case, the number and properties of the blocks of air interface resources for coordinated and uncoordinated use are preferably synchronously changed by all participating base stations in every air interface frame of N consecutive air interface frames.

By yet another embodiment, the cellular network is a heterogeneous cellular network ("HetNet") comprising at least one macro cell and at least two small cells, all located within a geographical proximity of each other, wherein the group of base stations comprises at least one base station associated with a macro cell and at least two base stations each associated with a different small cell, and wherein the at least two members that exchange messages directly with each other in order to coordinate which part of the blocks of air interface resources allocated by the central management entity for coordinated use, will be used by each of these at least two base stations, are the at least two base stations associated with small cells.

According to another aspect, there is provided a communication system configured to dynamically allocate air interface resources in a cellular network comprising at least three wireless cells, all located within a geographical proximity of each other, and a plurality of mobile devices currently located within these at least three wireless cells, wherein the system comprises:

(I) a central management entity that comprises:
- (a) one or more processors operable to:
  - (a.1) determine one or more classification rules for classifying each of the plurality of mobile devices, wherein the one or more classification rules are based on the one or more members of the group that consists of: the base station which provides service to the respective mobile device; location of the respective mobile device within the wireless cell (e.g. at the cell edge, at the cell core/center), wherein the latter classification rule may be defined for example in terms of range of the signal strength, path loss, SINR, and the like;
  - (a.2) provide to a group of base stations associated with the at least three cells, information that comprises:
    - (a.2.1) information that relates to the determined one or more classification rules;
    - (a.2.2) information that relates to semi-static allocation of blocks of air interface resources adapted for use by one or more specific members of the group of base stations, wherein these blocks of air interface resources would enable communications between base stations and mobile devices communicating therewith that match one or more classification rules, and wherein no coordination would be carried out between any member of the group of base station and any other member of that group regarding the use of the blocks of air interface resources; and
    - (a.2.3) information that relates to allocation of blocks of air interface resources adapted for use by at least two members of the group of base stations, wherein these blocks of air interface resources would enable communications between base stations and mobile devices communicating therewith that match one or more classification rules, and wherein coordination would be carried out between at least two members of the group of base stations regarding the use of the blocks of air interface resources;
- (b) one or more transmitters operable to convey the information generated by said one or more processors, towards the group of base stations; and (II) a group of base stations configured for use within the at least three cells, and wherein each of the base stations comprises at least one transceiver operable to exchange information with the central management entity and with at least one member of the group of base stations, and at least one transceiver operable to exchange information with a plurality of mobile devices associated therewith, and wherein at least two members of the group of base stations are configured to exchange messages directly there-between in order to coordinate which part of the blocks of air interface resources allocated by the central management entity for coordinated use, will be used by each of these at least two base stations.

The central management entity (e.g. a Centralized Self Optimization Network, a "cSON", entity) may be connected either to a management system of the cellular network and/or to a management system of a plurality of small cells, thereby enabling a managing entity (e.g. the cSON) to retrieve and provide information from the management system it is connected to and/or in a synchronized manner from both systems if it is connected indeed to both.

By yet another embodiment of this aspect, an air interface resource block is characterized by at least one member of the group that consists of: interval time for transmission, transmission frequency, a set of subcarriers, and the like.

According to still another embodiment, the at least two members of the group of base stations are further operable to repeat the exchange of the messages in order to negotiate use of resources within the blocks of air interface resources designated for coordinated use, i.e. for reestablishing which part of air interface resource blocks allocated by the central management entity for coordinated use, will be used by each of the base stations. Preferably, these messages are repeated every pre-defined period of time, which extends up to tens of msec.

In accordance with another embodiment, the one or more processors of the central management entity are further operable to re-define at least one of the one or more classification rule for classifying at least one of the plurality of mobile devices and the information provisioning to a group of base stations associated with the at least three cells, at a frequency which is substantially less than that at which the at least two members of the group of base stations exchange messages there-between.

By yet another embodiment, the cellular network is a heterogeneous cellular network ("HetNet") comprising at least one macro cell and at least two small cells, all located within a geographical proximity of each other, wherein the group of base stations comprises at least one base station associated with a macro cell and at least two base stations each associated with a different small cell, and wherein the at least two members that exchange messages directly with each other in order to coordinate which part of the blocks of air interface resources allocated by the central management entity for coordinated use, will be used by each of these at least two base stations, are the at least two base stations associated with small cells.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present disclosure by way of examples. It should be apparent, however, that the present disclosure may be practiced without these specific details.

Let us consider a particular example of deploying eNBs in a HetNet, which comprises small cells (i.e. metro cells), wherein the eNBs are configured to operate in one of the following two modes:

TABLE 1

| Mode | Definition |
| --- | --- |
| Mode A (Prior art) | The MLB dSON function is disabled by the cSON over ltf-N. The cSON application directly manages the eNB parameters over ltf-N as specified in 3GPP TS 28.657, TS 28.658, TS 28.659 |
| Mode B | The MLB dSON function is configured and enabled by the cSON over ltf-N. Certain parameters may remain under the control of the cSON |

In recent years, wireless networks operators have started to deploy their own or rely on end users to buy very small Base Stations, in order to meet the increasing demand for data traffic. This new type of cell sites, referred to herein below as "small cells" or "metro cells", used in conjunction with wireless cells of the traditional cellular networks (macro cells). Networks that include both macro cells and metrocells are referred to herein as heterogeneous networks (HetNets).

The term "small cells" as used herein and throughout the specification and claims encompass femtocells, picocells, microcells, and metrocells. Small-cell networks can also be realized by means of distributed radio technology consisting of centralized baseband units and remote radio heads. Beam-forming technology (focusing a radio signal on a very specific area) can be utilized to further enhance or focus small cell coverage. A common factor in all these approaches to small cells is that they are centrally managed by mobile network operators.

Figure 3:
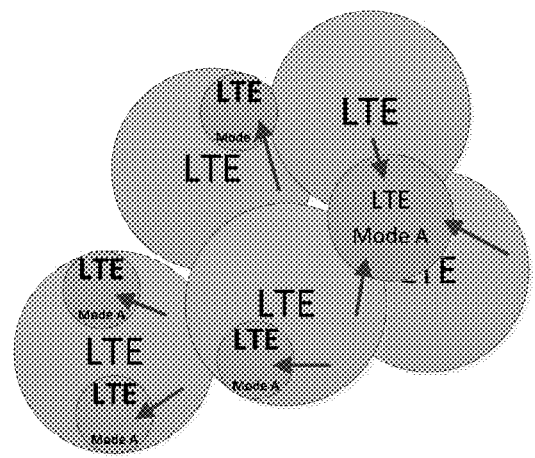
FIG. 3—exemplifies a prior art case of isolated LTE small cells deployed as overlay to LTE macro deployment.

FIG. 3 illustrates an example of a prior art solution using the mode A configuration discussed above. In this example, isolated LTE eNodeBs are deployed as an overlay onto UMTS or LTE macro deployment, wherein in this example LTE metro cells are deployed as a cluster with an underlying LTE macro deployment. This cluster of LTE eNodeBs should preferably be made by a single vendor, in order to ensure that the X2 interface that extends between the metro eNBs can be activated and the ICIC function can be enabled.

The following is a simplified example demonstrating one option of carrying out the above-discussed Mode A:

1) The cSON collects results of measurements made by UEs (via MDT if available).
2) Once every pre-defined time interval, the cSON:
   selects a parameter for modification e.g. the distance between the UE and the serving eNB, and modify the parameter in certain direction; and
   determines key indicators e.g. the total network throughput. In case of improvement, the modified value should be kept; otherwise, the change (modification) should be reversed.

Figure 4:
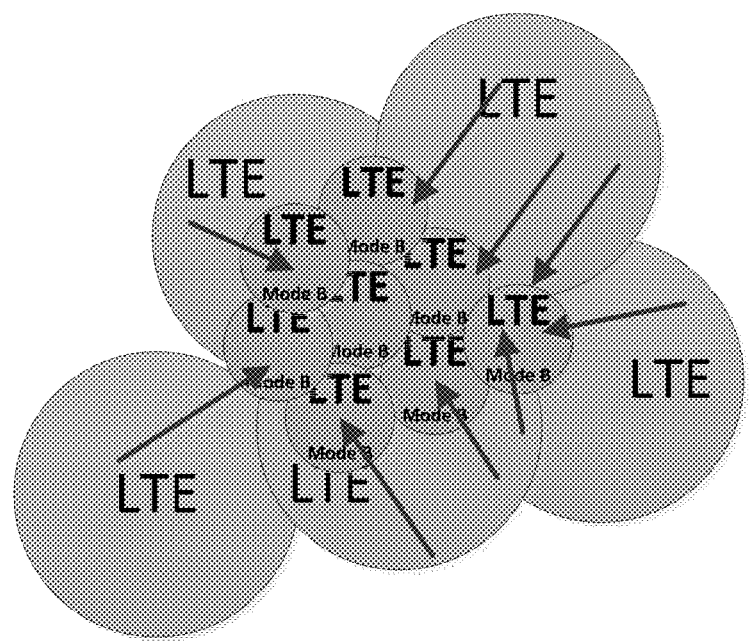
FIG. 4—exemplifies an example of LTE metro cells (small cells) deployed as a cluster with an underlying LTE macro deployment, and wherein one or more resource blocks are allocated for coordinated use by the cluster of metro cells.

Now, let us assume that macro or metro eNBs are operable in accordance with the present disclosure by implementing Mode B referred to above. FIG. 4 illustrates an example for implementing such Mode B configuration.

Examples of implementing such a configuration are demonstrated in the following non-exclusive Table 2:

TABLE 2

| Parameters | Examples |
| --- | --- |
| Definition of classification rules of UEs based on spatial regions in which the UEs are located | The classification rule "CELL_EDGE1" includes UEs that are connected to eNB #123456 or eNB #789012 operating according to Mode B, and located at a distance from the serving eNB which is greater than 30 m<br>The classification rule "CELL_CENTER1" includes UEs that are connected to the eNB #123456 or eNB #789012 and located at distance from the serving eNB which is less than 30 m |
| Parameters that define air interface resource blocks in the time-frequency plane | ULBlock1 = set of subcarriers with indices N1 . . . N2, over the whole Radio Frame. This block is for uncoordinated use.<br>ULBlock2 = set of subcarriers with indices N3 . . . N4, over the whole Radio Frame. This block is for coordinated use. |

TABLE 2-continued

| Parameters | Examples |
| --- | --- |
| Allocation of partitions to UEs and transmit power limitations | ULBlock1 is allocated for UL transmissions by UEs that match the classification rule CELL_CENTER1. Maximum allowed UL transmit power density associated with such UEs in ULBlock1 is $M_1$ ULBlock2 is allocated for UL transmissions by UEs that are connected to the eNBs #123456 and #789012 and located at the spatial region "CELL_EDGE1" Maximum allowed UL transmit power density associated with such UEs in ULBlock2 is $M_2$ |

In other words, the central management entity defines one or more classification rules for classifying the various mobile devices; for example CELL_EDGE1 in Table 2, transmit these rules to respective eNBs, and the eNB then applies these classification rule(s) to classify the mobile devices being in communication therewith.

For the case of Mode B operation, let us consider X2-based ICIC where eNBs exchange real time information that relates to past and future events associated with interference management. This in fact exemplifies an embodiment of the present disclosure according to which an X2-based dSON is configured by the central management entity, namely the cSON, and may include any one of the following:
RNTP—Relative Narrowband Transmit Power (a proactive signal);
OI—UL Interference Overload Indication (a reactive signal); and
HII—High Interference indication (a proactive signal).

This information is preferably used under real time conditions.

The following is a simplified example demonstrating an option of configuring the X2 ICIC by the cSON as follows:
RNTP Threshold as defined in TS 36.423;
Ranges to UL Interference Overload Indication to define high/medium/low interference; and
Threshold to differentiate between "high" and "low" interference levels.

Now, in accordance with the present disclosure, let us consider a method for allocating partitions (blocks) for coordinated use by a group (cluster) of eNBs operating in Mode B configuration.

Figure 5:
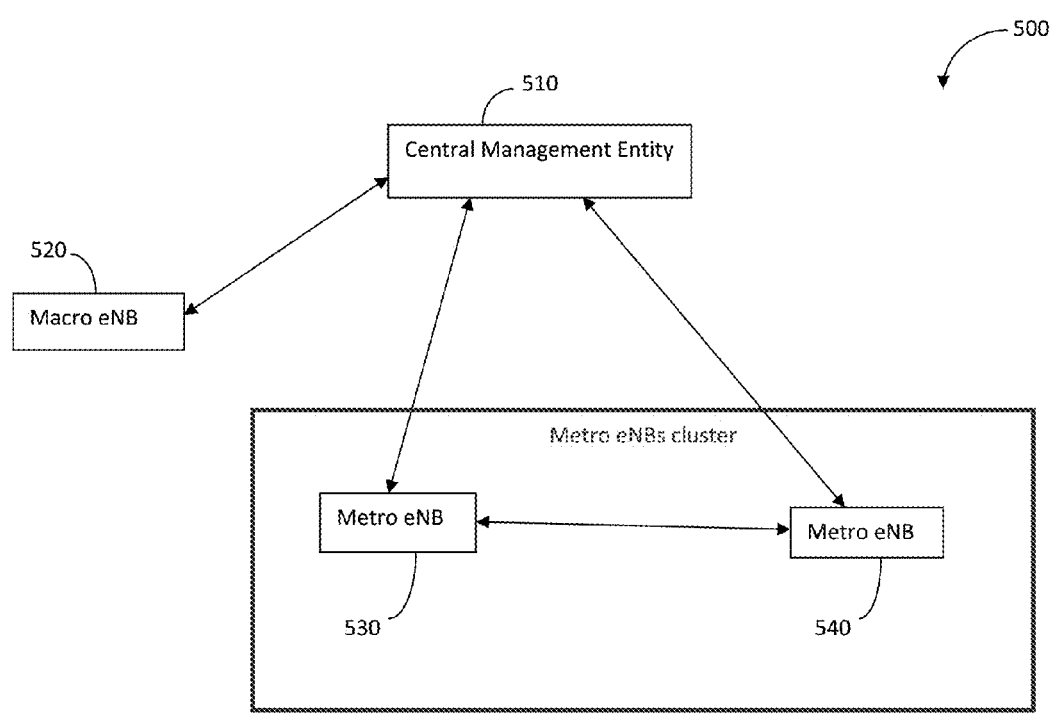
FIG. 5—illustrates a system according to an embodiment of the present disclosure.

FIG. 5 demonstrates an embodiment of an LTE system 500 for carrying out the present disclosure in a heterogeneous network (HetNet). The system illustrated in this figure comprises a central management entity (e.g. a cSON) 510, and three eNBs namely, 520, 530 and 540. The 520 eNB is operable in a macro cell, whereas eNBs 530 and 540 are each operable in a metro cell.

Figure 6:
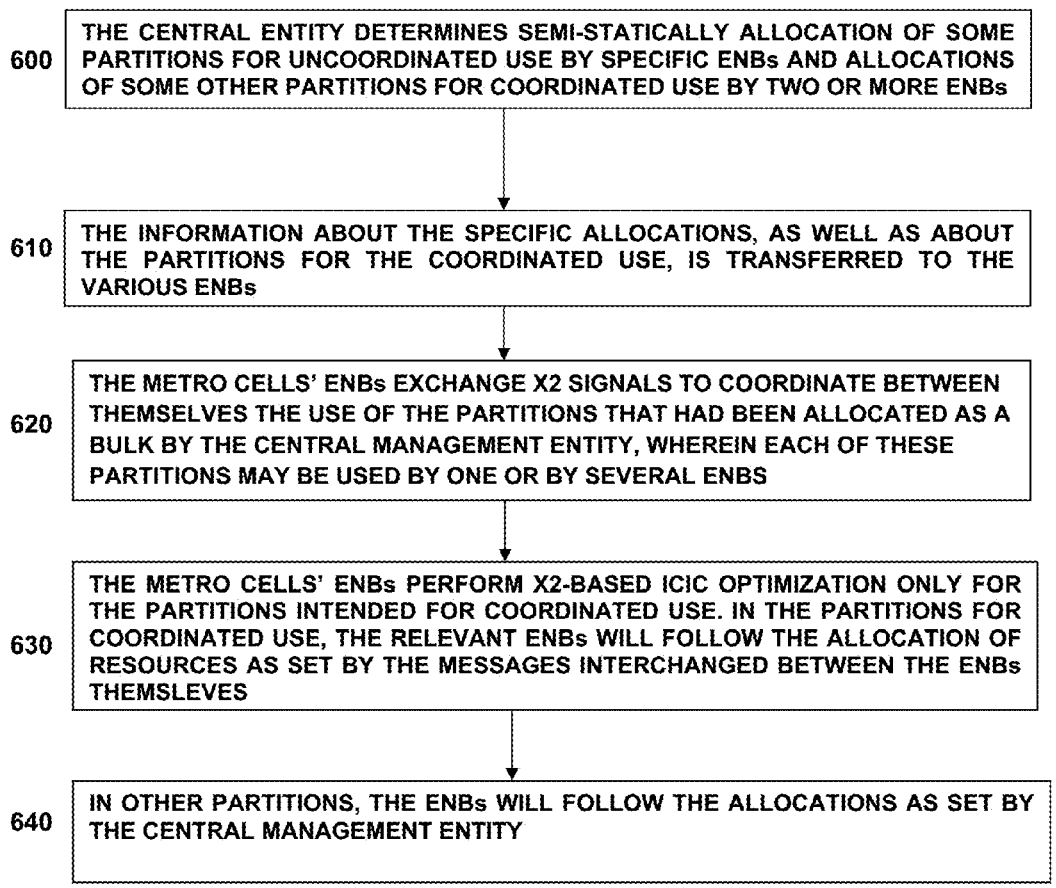
FIG. 6—exemplifies a method of carrying out an embodiment of the present disclosure in the system illustrated in FIG. 5.

FIG. 6 illustrates an example of carrying out the disclosure in the system illustrated in FIG. 5. It should be noted that in this case, the metro eNBs may originate from same vendor while the macro eNB does not necessarily be originated from that same vendor. The central managing entity, the cSON, determines semi-statically allocation of air interface resource blocks to specific eNBs/UE categories/spatial domain(s) for non-coordinated use, and also determines allocations of certain partitions for coordinated use by two or more eNBs (step 600). The information about the specific allocations, as well as about the partitions which use will be coordinated by the two or more eNBs, is transferred to the eNBs 510, 520 and 530 (step 610). It should be noted however that a single partition in coordinated use may be allocated to the whole cluster of metro eNBs as shown for example in FIG. 4. The eNBs of the metro cells, 530 and 540 exchange X2 signals between themselves (step 620) and perform X2-based ICIC optimization only for the partitions allocated for coordinated use (step 630). Each of these partitions (allocated for coordinated use) may be used by one or by several eNBs. In the partitions allocated for non-coordinated use all three eNBs 520, 530 and 540 will follow the allocations of resources as set by the cSON (step 640), whereas in the partitions allocated for coordinated use, the relevant eNBs (namely, 530 and 540) will follow the allocations of resources as set by the messages interchanged by these eNBs themselves.

Figure 1:
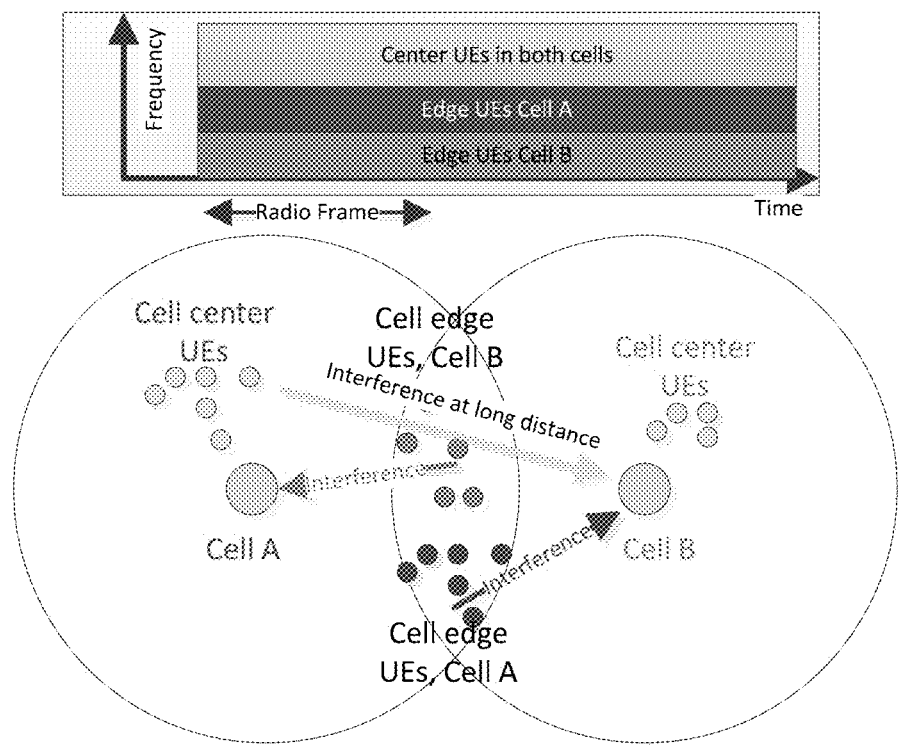
FIG. 1—illustrates an example of a prior art allocation of time-frequency resources in blocks (partitions) that appear as rectangles in time-frequency plane.
Figure 2A:
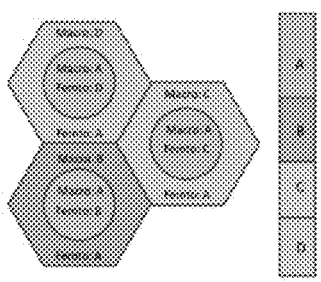
FIGS. 2A and 2B—illustrate prior art FFR schemes used for HetNets that allow significant reuse of spectrum.
Figure 2B:
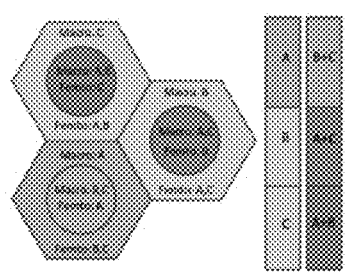
Figure 7:
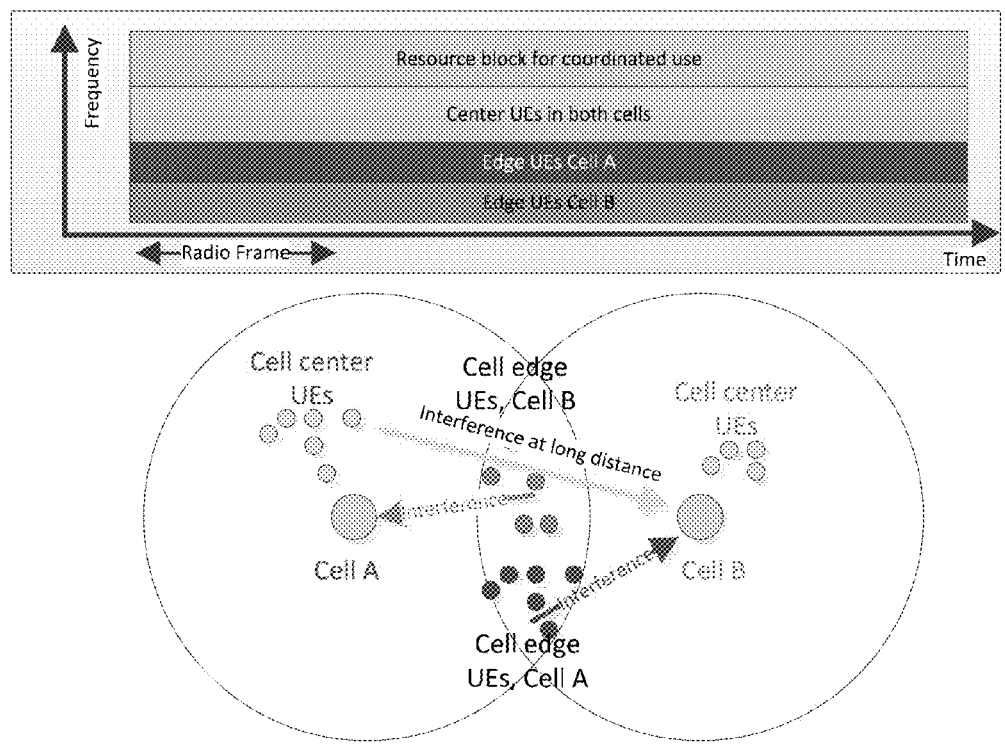
FIG. 7—illustrates a method of carrying out interference mitigation by using coordinated and uncoordinated air interface resource blocks according to an embodiment of the present disclosure.
Figure 8:
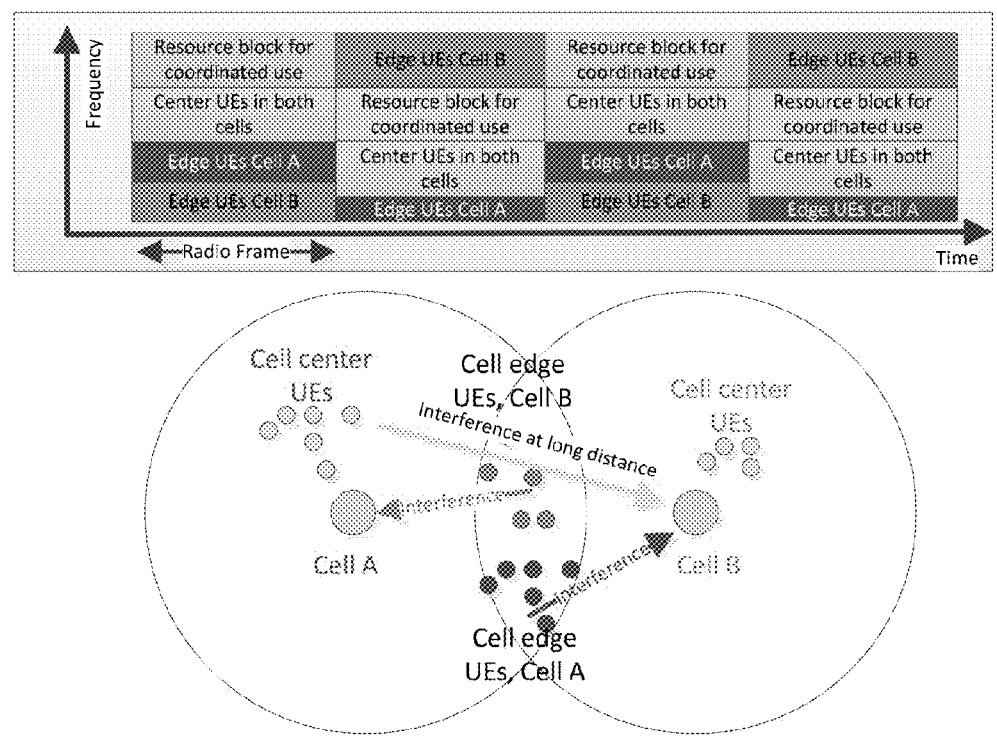
FIG. 8—illustrates a method of carrying out interference mitigation by using coordinated and uncoordinated air interface resource blocks according to an embodiment of the present disclosure where time based pattern of the length N=2 radio frames is used.

FIG. 7 and FIG. 8 illustrate methods of carrying out interference mitigation by using coordinated and uncoordinated air interface resource blocks according to an embodiment of the present disclosure, which is different from the prior art method illustrated in FIG. 1. The embodiment illustrated in FIG. 8, relates to the case where a time based pattern having the length N=2 radio frames, is used.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present disclosure has been described using detailed descriptions of embodiments thereof that are provided by way of example and are not intended to limit the scope of the disclosure in any way. The described embodiments comprise different features, not all of which are required in all embodiments of the disclosure. Some embodiments of the present disclosure utilize only some of the features or possible combinations of the features. Variations of embodiments of the present disclosure that are described and embodiments of the present disclosure comprising different combinations of features noted in the described embodiments will occur to persons of the art. The scope of the disclosure is limited only by the following claims.

The invention claimed is:
1. A method comprising:
receiving, by a plurality of base stations, classification rules associated with rules for classifying user equipment (UE) connected to the plurality of base stations and allocation information associated with an allocation of air interface resource blocks for a first allocation portion of air interface resource blocks designated for coordinated use among at least two of the plurality of base stations and a second allocation portion of air interface resource blocks designated for uncoordinated use by one or more of the plurality of base stations;

determining, by the at least two of a plurality of base stations, one or more UE that are to perform communications using the first allocation portion of air interface resource blocks, wherein the one or more UE are determined according to the classification rules;

determining, by the one or more of the plurality of base stations, at least two UE that are to perform communications using the second allocation portion of air interface resource blocks, wherein the at least two UE are determined according to the classification rules; and exchanging messages between the at least two of the plurality of base stations to coordinate specific air interface resource blocks among the first allocation portion of air interface resource blocks that are to be used for communications by the at least two of the plurality of base stations, wherein the exchanging messages between the at least two of the plurality of base stations to coordinate the specific air interface resource blocks among the first allocation portion of air interface resource blocks is performed to mitigate interference between the at least two of the plurality of base stations.

2. The method of claim 1, wherein the classification rules comprise one or more rules for classifying UE as either cell edge UE or cell center UE, wherein a particular UE connected to a particular base station is classified based on a distance of the particular UE from the particular base station.

3. The method of claim 2, wherein a particular classification rule classifies UE that are located more than a pre-defined distance from a serving base station as cell edge UE.

4. The method of claim 3, wherein the pre-defined distance is 30 meters.

5. The method of claim 1, wherein a particular air interface resource block is characterized by one or more of: an interval time for transmission, a transmission frequency and a set of one or more subcarriers.

6. The method of claim 1, wherein the one or more of the plurality of base stations which determine the at least two UE to perform communications using the second allocation portion of air interface resource blocks include one or more of: a small cell base station and a macro cell base station.

7. The method of claim 1, wherein the one or more of the plurality of base stations which determine the at least two UE that are to perform communications using the second allocation portion of air interface resource blocks include at least two small cell base stations.

8. The method of claim 1, wherein the allocation information comprises one or more parameters that define a first set of subcarriers for the first allocation portion and that define a second set of subcarriers for the second allocation portion for a particular radio frame.

9. The method of claim 1, further comprising:
determining the classification rules for the plurality of base stations by a central management entity;
determining the allocation information by the central management entity; and
generating one or more messages for communicating the classification rules and the allocation information to the plurality of base stations.

10. One or more non-transitory tangible media encoding logic that includes instructions for execution that when executed by a processor, is operable to perform operations comprising:

receiving, by a plurality of base stations, classification rules associated with rules for classifying user equipment (UE) connected to the plurality of base stations and allocation information associated with an allocation of air interface resource blocks for a first allocation portion of air interface resource blocks designated for coordinated use among at least two of the plurality of base stations and a second allocation portion of air interface resource blocks designated for uncoordinated use by one or more of the plurality of base stations;

determining, by the at least two of a plurality of base stations, one or more UE that are to perform communications using the first allocation portion of air interface resource blocks, wherein the one or more UE are determined according to the classification rules;

determining, by the one or more of the plurality of base stations, at least two UE that are to perform communications using the second allocation portion of air interface resource blocks, wherein the at least two UE are determined according to the classification rules; and exchanging messages between the at least two of the plurality of base stations to coordinate specific air interface resource blocks among the first allocation portion of air interface resource blocks that are to be used for communications by the at least two of the plurality of base stations, wherein the exchanging messages between the at least two of the plurality of base stations to coordinate the specific air interface resource blocks among the first allocation portion of air interface resource blocks is performed to mitigate interference between the at least two of the plurality of base stations.

11. The media of claim 10, wherein the classification rules comprise one or more rules for classifying UE as either cell edge UE or cell center UE, wherein a particular UE connected to a particular base station is classified based on a distance of the particular UE from the particular base station.

12. The media of claim 11, wherein a particular classification rule classifies UE that are located more than a pre-defined distance from a serving base station as cell edge UE.

13. The media of claim 12, wherein the pre-defined distance is 30 meters.

14. The media of claim 10, wherein a particular air interface resource block is characterized by one or more of: an interval time for transmission, a transmission frequency and a set of one or more subcarriers.

15. The media of claim 10, wherein the allocation information comprises one or more parameters that define a first set of subcarriers for the first allocation portion and that define a second set of subcarriers for the second allocation portion for a particular radio frame.

16. The media of claim 10, the operations further comprising:
determining the classification rules for the plurality of base stations by a central management entity;
determining the allocation information by the central management entity; and
generating one or more messages for communicating the classification rules and the allocation information to the plurality of base stations.

17. A system comprising:
a plurality of base stations, each of the plurality of base stations comprising at least one processor that operates to execute instructions, wherein when executing the instructions the at least one processor for each of the plurality of base stations operates to:

receive classification rules associated with rules for classifying user equipment (UE) connected to the plurality of base stations;
receive allocation information associated with an allocation of air interface resource blocks for a first allocation portion of air interface resource blocks designated for coordinated use among at least two of the plurality of base stations and a second allocation portion of air interface resource blocks designated for uncoordinated use by one or more of the plurality of base stations;
determine one or more UE that are to perform communications using the first allocation portion of air interface resource blocks, wherein the one or more UE are determined according to the classification rules for at least two of the plurality of base stations;
determine at least two UE that are to perform communications using the second allocation portion of air interface resource blocks, wherein the at least two UE are determined according to the classification rules for one or more of the plurality of base stations; and
exchange messages between the at least two of the plurality of base stations to coordinate specific air interface resource blocks among the first allocation portion of air interface resource blocks that are to be used for communications by the at least two of the plurality of base stations, wherein the exchanging messages between the at least two of the plurality of base stations to coordinate the specific air interface resource blocks among the first allocation portion of air interface resource blocks is performed to mitigate interference between the at least two of the plurality of base stations.

18. The system of claim 17, wherein the classification rules comprise one or more rules for classifying UE as either cell edge UE or cell center UE, wherein a particular UE connected to a particular base station is classified based on a distance of the particular UE from the particular base station.

19. The system of claim 17, wherein the allocation information for the first allocation portion and the second allocation portion comprises one or more parameters that define a first set of subcarriers for the first allocation portion and that define a second set of subcarriers for the second allocation portion for a particular radio frame.

20. The system of claim 17, further comprising:
a central management entity comprising at least one processor that operates to execute instructions, wherein when executing the instructions the at least one processor for the central management entity operates to:
determine the classification rules for the plurality of base stations;
determine the allocation information for the plurality of base stations; and
generate one or more messages for communicating the classification rules and the allocation information to the plurality of base stations.

* * * * *